United States Patent [19]

DeVault

[11] Patent Number: 4,732,008
[45] Date of Patent: Mar. 22, 1988

[54] TRIPLE EFFECT ABSORPTION CHILLER UTILIZING TWO REFRIGERATION CIRCUITS

[75] Inventor: Robert C. DeVault, Knoxville, Tenn.

[73] Assignee: The United States of America as represented by the United States Department of Energy, Washington, D.C.

[21] Appl. No.: 933,943

[22] Filed: Nov. 24, 1986

[51] Int. Cl.[4] .............................................. F25B 7/00
[52] U.S. Cl. ...................................... 62/79; 62/238.3; 62/332; 62/335; 62/476
[58] Field of Search .................... 62/332, 333, 335, 79, 62/476, 238.3

[56] References Cited

U.S. PATENT DOCUMENTS

| | | | |
|---|---|---|---|
| 2,350,115 | 5/1944 | Katyow | 62/79 |
| 3,483,710 | 12/1969 | Bearint | 62/335 X |
| 4,441,332 | 4/1984 | Wilkinson | 62/332 X |
| 4,448,040 | 5/1984 | Kunugi | 62/332 X |
| 4,531,374 | 7/1985 | Alefeld | 62/476 |
| 4,542,628 | 9/1985 | Sarkisian et al. | 62/476 X |

OTHER PUBLICATIONS

P. D. Iedema, "The Absorption Heat Pump ... Methanol", Department of Mechanical Engineering, Delft University of Technology, Netherlands, Apr. 1984.

K. Stephan et al., "Heating with Two-Stage Absorption Heat Pumps", Institut für Technische Thermodynamik und Thermische Verfahrenstechnik der Universitat Stuttgart, pp. 1-21, 4/1984.

Hanna et al.,: The Battelle Dual-Cycle Absorption Heat Pump", Proceedings of the Oklahoma State University 7th Annual Heat Pump Conference, 4/1984.

Primary Examiner—Lloyd L. King
Attorney, Agent, or Firm—Stephen D. Hamel; Judson R. Hightower

[57] ABSTRACT

A triple effect absorption method and apparatus having a high coefficient of performance. Two single effect absorption circuits are combined with heat exchange occurring between a condenser and absorber of a high temperature circuit, and a generator of a low temperature circuit. The evaporators of both the high and low temperature circuits provide cooling to an external heat load.

14 Claims, 4 Drawing Figures

TRIPLE EFFECT ABSORPTION CHILLER UTILIZING TWO REFRIGERATION CIRCUITS

BACKGROUND OF THE INVENTION

The present invention relates to a method and apparatus for an absorption refrigeration cycle and machine with significantly increased thermal performance compared to existing single effect, double-effect, or dual loop absorption chiller/heat-pump/refrigeration cycle machines.

Absorption chillers are heat driven refrigeration machines which have been manufactured for several decades. Prior to the mid 1970's "energy crisis", when natural gas was relatively inexpensive, simple absorption machines, operating at relative low efficiency, typically 0.5 to 0.7 coefficient of performance (COP), were economically attractive. Those machines were characterized as quiet, vibration-free, reliable machines whose initial cost per ton of capacity was somewhat higher than equivalent electric equipment. With the increase in natural gas prices since the mid 1970's, however, conventional absorption chillers have lost their economic attractiveness.

In absorption refrigeration cycles, a secondary fluid, the absorbent, absorbs the primary fluid, gaseous refrigerant, that has been vaporized in the evaporator. In a typical single effect absorption refrigeration system, water is used as the refrigerant and lithium bromide as the absorbent. The refrigerant/absorbent combination is known as the solution pair. Other chemical combinations (solutions) have been used, or have the potential for use, in absorption cycles.

The mode of operation for a single effect absorption chiller is illustrated in FIG. 1. Refrigerant vapor is produced in the evaporator at a temperature somewhat below that of the heat load. The refrigerant vapor is exothermically absorbed by a concentrated absorbent solution entering the absorber. The heat of absorption is then transferred to a heat sink, such as cooling water, at the absorber. The now dilute absorbent solution is pumped to the generator, where it is concentrated again and returned to the absorber. External heat is supplied to the generator to supply the energy required to separate the refrigerant from the absorbent. The refrigerant is condensed at the condenser and is returned to the evaporator while the concentrated absorbent is returned to the absorber. A heat exchanger between the absorber and generator is also part of the system, exchanging heat to the dilute absorbent from the concentrated absorbent solution.

The above process takes place between two pressures: a lower pressure prevailing in the evaporator-absorber section and a higher pressure in the generator-condenser section. The operating temperature limits of the refrigerant/absorbent combination (solution pair), are determined by the chemical and physical properties of the pair.

The cooling thermal efficienty (COP) of a single effect cycle is typically about 0.5 to 0.7. Modifications of the basic cycle do not bring the coefficient of performance over a threshold of unity, e.g., heat required to generate one pound of refrigerant is not less than the heat taken up when this pound evaporates in the evaporator. Performance can be improved by using the double-effect evaporation principle practiced by the chemical industry for decades and a double-effect generator. With a water lithium bromide pair, two generators can be used. One, at high temperature and pressure, is heated by an external source of thermal energy. A seocnd, at lower pressure and temperature, is heated by condensation of the vapor from the first generator. Condensate from both generators moves to the evaporator. This enables the external thermal energy to be effectively utilized twice in the high and low temperature generators, thereby increasing the overall thermal efficiency as compared to single effect absorption systems.

The thermal efficiency of double-effect cycles is typically about 1.0 to 1.2, with one double-effect absorption machine reported to have attained a 1.3 COP.

Dual loop absorption cycles have been proposed and are being developed in which two separate absorption loops, a high temperature loop and a lower temperature loop, are combined to offer desirable features beyond those attainable with double-effect systems. The previous dual loop systems shown in U.S. Pat. Nos. 3,483,710 and 4,542,628 feature a high temperature condenser in heat exchange relation with a low temperature generator (U.S. Pat. No. 3,483,710), or a high temperature condenser and a high temperature absorber in heat exchange relation with a low temperature generator with simultaneous heat exchange between the high temperature evaporator and the low temperature generator and/or low temperature absorber (U.S. Pat. No. 4,542,628).

Additionally, the latter dual loop thermodynamic cycle (but not a machine concept) has been separately proposed by other absorption researchers, viz., P. D. Iedema, *The Absorption Heat Pump with Lithium Bromide/Zinc Bromide Methanol*, WTHD No. 162, Laboratory of Refrigeration and Indoor Technology, Department of Mechanical Engineering, Delft University of Technology, The Netherlands, April 1984. In these prior dual loop heat pump concepts, the dual loop absorption cycle thermal efficiency is approximately the same as double effect machines for air conditioning and refrigeration applications, since the external thermal energy is effectively utilized twice to produce the desired cooling effect in the evaporator.

SUMMARY OF THE INVENTION

It is accordingly an object of the invention to provide an absorption chiller method and apparatus utilizing two separate singe-effect absorption refrigeration circuits operating at relatively higher and lower temperatures, respectively, in which the external heat input is effectively utilized three times to thereby improve the coefficient of performance.

This is achieved by an absorption apparatus comprising: a first absorption system circuit for operation within a first temperature range, a second absorption system circuit for operation within a second lower temperature range relative to the first circuit, the first circuit having generator means, condenser means, evaporator means, and absorber means operatively connected together, the second circuit having generator means, condenser means, evaporator means, and absorber means operatively connected together, the first circuit condenser means and the first circuit absorber means being in heat exchange communication with the second circuit generator means, and the first and second evaporator means being in heat exchange communication with an external heat load.

BRIEF DESCRIPTION OF THE DRAWINGS

For a full understanding of the invention, reference should be made to the following detailed description and the drawings, wherein.

DETAILED DESCRIPTION OF THE PREFERRED EMBODIMENTS

Figure 1:
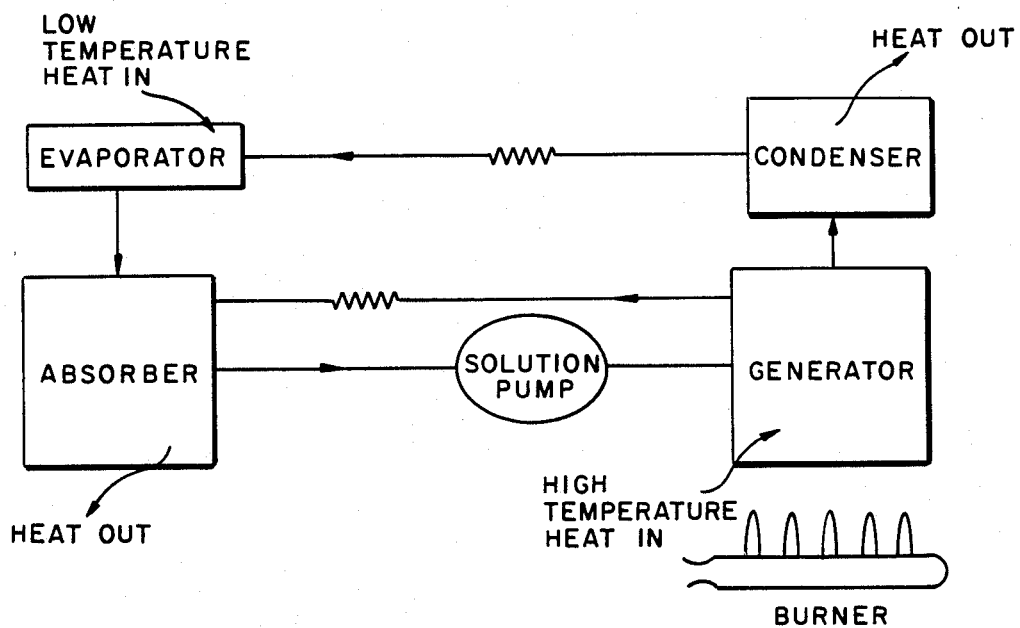
FIG. 1 is a schematic diagram of a prior art single effect absorption system.
Figure 2:
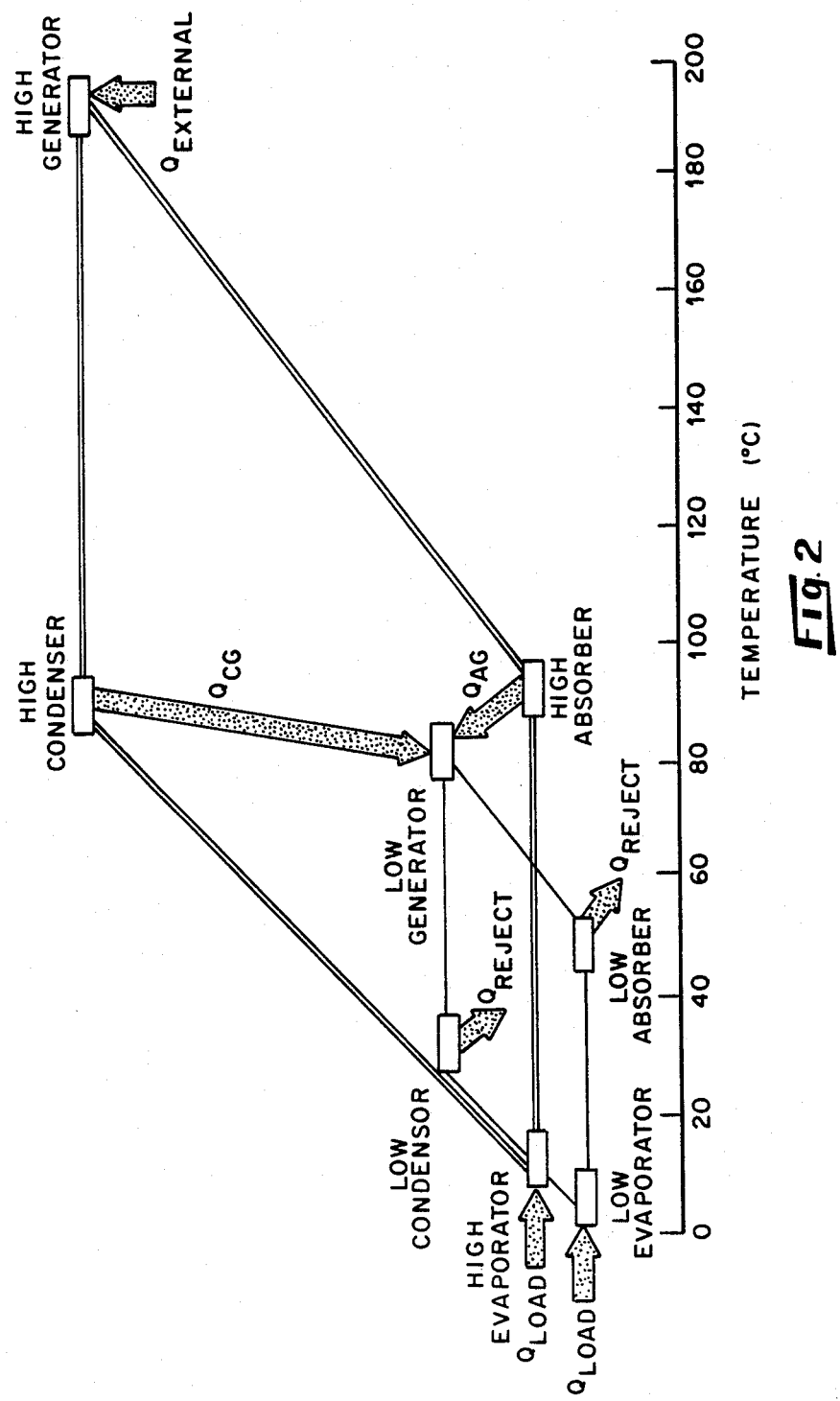
FIG. 2 is a schematic diagram of a triple effect absorption system of the invention illustrating the thermodynamic relationship between the various components.

A thermodynamic representation of the invention is illustrated in FIG. 2. The invention uses two refrigeration circuits with separate solution fluids in each circuit, a higher temperature refrigeration circuit being in heat exchange with a lower temperature refrigeration circuit. This arrangement combines the two refrigerant circuits in a different manner than the prior dual loop concepts, resulting in a different relationship between the components in each refrigeration circuit. The results in a significantly increased thermal performance since the external thermal energy is effectively utilized three times to produce the desired cooling effect in the evaporator. Hence the designation triple-effect. The apparatus of the invention is 30% to 50% more efficient than the prior art double-effect machine or dual loop concepts.

The high temperature circuit is designed to operate in the same fashion as a conventional single-effect absorption chiller, except that the condenser and the absorber of this high temperature circuit are operated at a much higher temperature than in a conventional single effect machine. Desirably, the high temperature circuit may be operated within a temperature range of from about 0° C. to about 280° C., and the lower temperature heat absorption circuit may be operated within a temperature range of from about 0° C. to about 130° C.

Taken alone, this high temperature circuit would have poorer thermodynamic performance than either a conventional single-effect machine or the high temperature loop of the prior art dual loop concepts. The lower temperature absorption refrigeration circuit is thermodynamically a conventional single-effect absorption chiller. By operating the high temperature circuit so that both the high temperature circuit condenser and the high temperature circuit absorber are at a higher temperature than the generator of the lower temperature circuit, all of the heat rejected by both the high temperature circuit condenser and the high temperature circuit absorber can be effectively utilized to heat the low temperature circuit generator, thereby producing about twice as much refrigerant vapor in the lower temperature circuit than was generated in the high temperature circuit with the input of external thermal energy. This concept thereby produces about 50% more refrigerant vapor for the same exteral thermal energy input as compared to double-effect absorption chillers or the dual loop concept (U.S. Pat. No. 3,483,710). Simultaneously, the high temperature circuit evaporator is operated at a lower enough temperature to provide useful cooling. The high temperature loop evaporator in the prior dual loop concept (U.S. Pat. No. 4,542,628) operates at too high a temperature to provide useful cooling and, therefore, the only cooling effect in the dual loop concept of U.S. Pat. No. 4,542,628 is from the evaporator in the lower temperature loop. By effectively utilizing the cooling effect of both the high temperature circuit evaporator and the evaporator in the lower temperature circuit, the invention produces about 50% more useful cooling effect for the same external thermal energy input as compared to prior art dual loop concept of U.S. Pat. No. 4,542,628.

Although not absolutely necessary, it is advantageous to stage the operation of the high temperature circuit evaporator and the low temperature circuit evaporator so that the high temperature circuit evaporator is operated at as high a temperature as possible while still providing useful cooling, so that the high temperature circuit generator can be operated at as low a temperature as possible, since there is a direct relationship between evaporator, condenser, absorber, and generator temperatures.

The above-described system is specifically useful as an air-conditioning system to transfer heat from an indoor environment to an outdoor environment. The above described cycle can also be operated as a heat pump to transfer heat from an outdoor environment to an indoor environment and provide heating as well as cooling at above freezing evaporator conditions. In below freezing evaporator conditions, the apparatus can be used as a direct fired heater, as is conventional practice for some previously developed absorption chiller/heaters.

Figure 3:
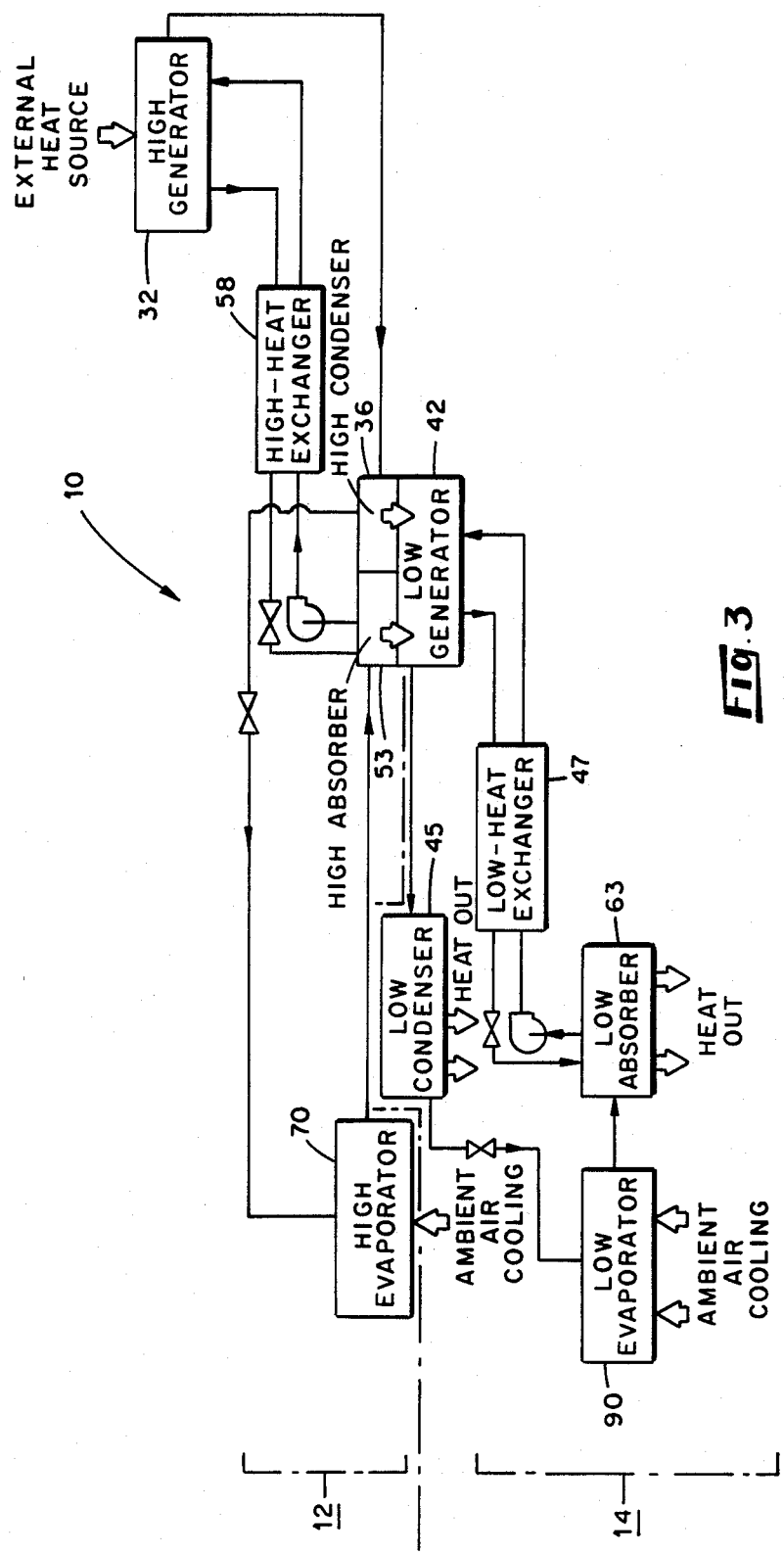
FIG. 3 is a schematic diagram of the triple effect absorption cycle of the invention.
Figure 4:
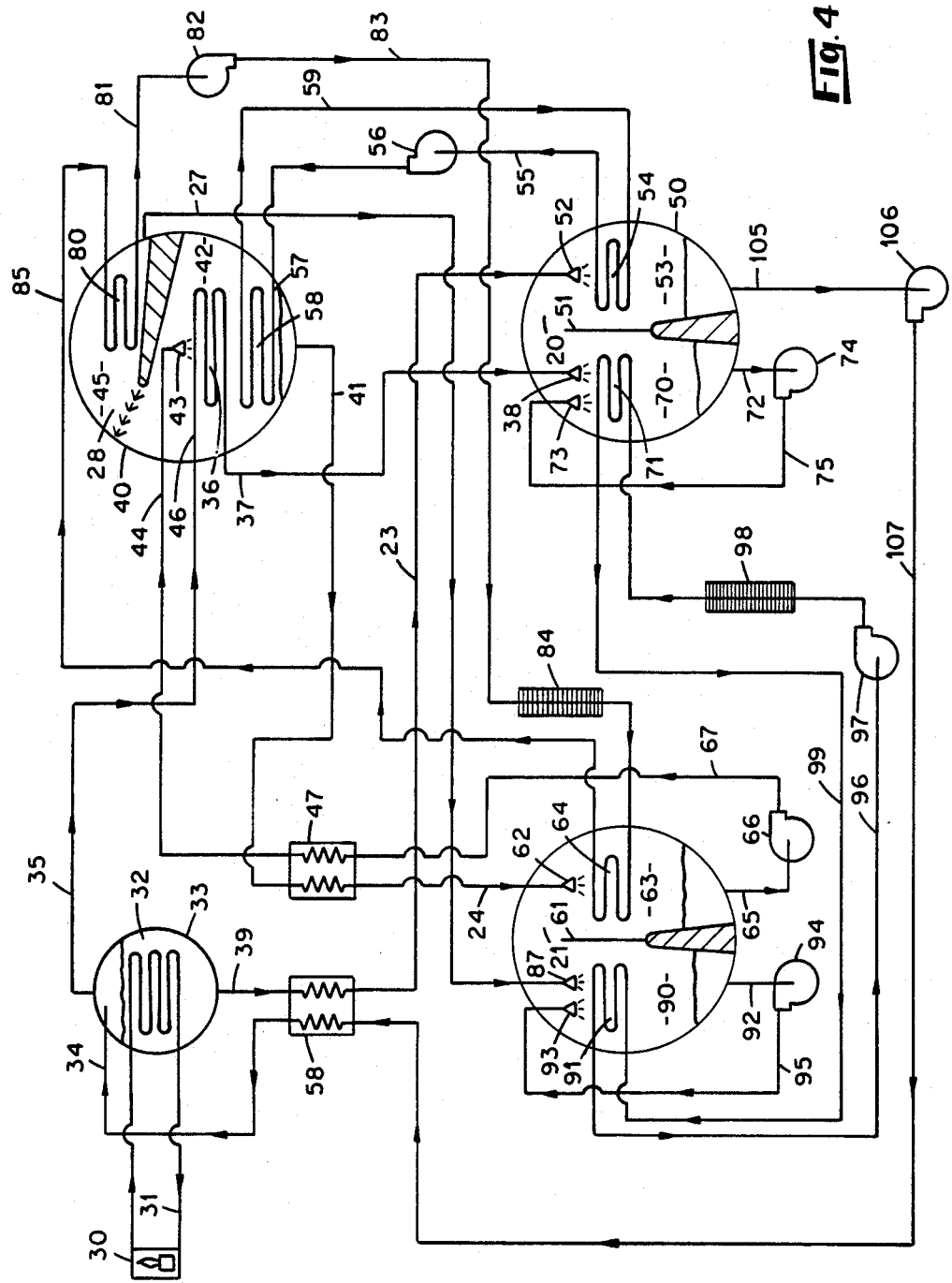
FIG. 4 is a detailed schematic diagram of one embodiment of the apparatus of the invention.

FIGS. 3 and 4 illustrate schematically one embodiment of the invention, in which a triple effect absorption apparatus is indicated generally by the number 10. The apparatus includes high temperature circuit or upper circuit or stage 12, and a lower temperature circuit or lower circuit or stage 14.

In each circuit, an absorption pair (or multiple fluid component mixture) is used. The solution pair of the low temperature circuit can be any known absorption solution pair usable in a conventional single-effect absorption cycle. A preferred solution pair for the low temperature circuit is a conventional mixture of lithium bromide, water, a heat transfer additive, and a corrosion inhibitor. Other solution pairs useful for the lower temperature circuit include, for example, ammonia and water, R-22 and E-181, R-123a and ETFE, a ternary mixture of methanol with lithium bromide and zinc bromide, a ternary mixture of water with zinc chloride and lithium bromide, and many other absorption fluid solution mixtures.

The high temperature circuit is more limited in the available absorption solution pairs which can be used because of the required higher temperature of the high generator, which should be about 200° C. or higher, and the much larger temperature difference required between the high evaporator, which may be about 5° to 10° C. and the high condenser and high absorber, which may be at about 90° to 110° C., for example. A conventional mixture of lithium bromide, water, a heat transfer additive and a corrosion inhibitor cannot ordinarily be used in the high temperature circuit because of the cystallization limit of the lithium bromide/water solution pair.

Absorption solution pairs that can be used in the high temperature circuit include, for example, ammonia and water, ammonia with lithium bromide and water, ammonia and various thiocyanate salt mixtures, sodium hydroxide and water, trifluoroethanol (TFE) and several absorbents, and other absorption fluid solution mixtures.

A preferred absorption solution mixture for the high temperature circuit is a known mixture of lithium bromide, water, an anti-crystallization additive (e.g., ethylene glycol), a heat transfer additive and a corrosion inhibitor. The ratio of lithium bromide to known anti-crystallization additive is from about 2 to 1 to about 5 to 1, with about 4.5 to 1 preferred.

Referring to FIG. 3, the high temperature circuit 12 comprises a high temperature generator 32, a high temperature condenser 36, a high temperature evaporator 70, and a high temperature absorber 53, while the low temperature circuit 14 comprises a low temperature generator 42, a low temperature condenser 45, a low temperature evaporator 90, and a low temperature absorber 63.

The high temperature and low temperature circuits are coupled so that rejected heat from the high temperature circuit absorber 53 and high temperature circuit condenser 36 is used as input heat for the low temperature circuit generator 42. The operating conditions are chosen so that the algebraic sum of these heats is zero. Thus the heat to the low temperature circuit generator 42 will be nominally twice that to the high temperature circuit generator 32, resulting in an enhanced thermal efficiency.

With reference specifically to FIG. 4, high temperature circuit generator 32 is contained within a shell 33 and is heated by heat which flows from an external heat source 30 through conduit 31. External heat source 30 may be any suitable heat source such as a burner, high temperature stream, etc. Heat is transferred from conduit 31 to a weak absorbent solution being discharged from conduit 34. The heat concentrates the absorbent solution by removing refrigerant therefrom. The released refrigerant vapor flows from the high temperature circuit generator 32 through conduit 35 into low temperature circuit generator 42 which is within shell 40. The vaporized refrigerant is condensed within conduit means 46 which extends through high temperature condenser region 36 in a portion of low temperature generator 42 and the condensed refrigerant then flows through conduit 37 and is thereafter discharged through spray header 38 into high temperature circuit evaporator 70, which is within shell 50. The condensed refrigerant within shell 50 is recirculated through conduit 72 by high temperature refrigerant pump 74 by way of conduit 75 through spray header 73 back to the high temperature evaporator 70.

Vaporized refrigerant from within shell 50, i.e. refrigerant which evaporates in evaporator 70, flows through opening 20 in partition 51 which separates the high temperature evaporator 70 from the high temperature absorber 53, where it dilutes or weakens the strong absorbent solution supplied to the high temperature absorber 53 from high temperature generator 32 by way of conduit means 39, high temperature solution heat exchanger 58 and conduit 23 through spray header 52.

In the high temperature circuit 12 the weak absorbent solution from high temperature absorber 53 is pumped by high temperature solution pump 106 by way of conduit means 105, 107, and 34, through high temperature solution heat exchanger 58 to high temperature generator 32, thus completing the fluid flow through high temperature circuit 12.

In operation, the low temperature generator 42 is in heat transfer relationship with conduit 46 of high temperature condenser 36 and conduit 57 of heat exchanger 58 which transfers heat from high temperature absorber 53. Heat exchanger 58 is a closed loop heat exchanger including circulation pump 56, and conduit means 55, 57, and 59, and serves to provide heat exchange between high temperature absorber 53 and low temperature generator 42.

In the low temperature circuit 14, the low temperature absorber 63 is connected to low temperature generator 42 through heat exchanger 47 by weak solution conduit means 65, 67 and 44 and pump 66, and by strong solution conduit means 41 and 24. The low temperature generator 42 is connected to low temperature condenser 45 within shell 40 through demister 28. The low temperature condenser outlet is connected to the low temperature evaporator 90 by conduit means 27, which leads to spray header 87 within evaporator 90. Condensed refrigerant is recirculated through low temperature evaporator 90 by means of conduit 92, pump 94, conduit 95 and spray header 93.

In the low temperatue circuit 14 strong absorbent solution flows from low temperature generator 42 through conduit means 41, heat exchanger 47 and conduit means 24 to spray header 62 into low temperature absorber 63 where it absorbs refrigerant vapor coming from evaporator 90 through opening 21 in partition 61. The resulting weak solution is pumped through heat exchanger 47 via conduits 65, 67, and 44 and spray header 43 by low temperature solution pump 66.

A secondary fluid, such as cooling tower water, may be circulated through the low temperature condenser 80 and an absorber coil 64 in the low temperature absorber 63 by means of conduits 85, 81, and 83 and circulating pump 82. The exemplary cooling tower 84 may also be an air coil depending upon the application. The conduits 85, 81, and 83 are shown in a series flow arrangement, but they can also be arranged for parallel flow for the low temperature condenser 80 and the low temperature absorber 63.

Another secondary fluid, such as the chilled water supply to the building to be air-conditioned, i.e., the heat load, is circulated through evaporator coil 71 in the high temperature evaporator 70 and evaporator coil 91 in the low temperature evaporator 90 by means of conduits 96 and 99 and circulating pump 97. The exemplary air coil 98 represents the heat load to be cooled by the chilled water supplied by the high temperature evaporator 70 and the low temperature evaporator 90. The chilled water conduit 96 and 99 is shown in a series flow arrangement, but can also be arranged for parallel flow through the high temperature evaporator 70 and the low temperature evaporator 90.

As used herein, reference to a device as a "high temperature" device, e.g. high temperature refrigerant pump, is not intended to necessarily refer to a pump which operates at extraordinarily high temperatures, but instead is merely intended to indicate that the pump is part of the high temperature refrigeration circuit, i.e., the circuit which operates at relatively higher temperature compared to the low temperature refrigeration circuit. Similar considerations apply to references to a device as a "low temperature" device.

The foregoing description has been set forth merely to illustrate the invention and is not intended to be limiting. Since modifications of the described embodiments incorporating the spirit and substance of the invention may occur to persons skilled in the art, the scope of the invention should be construed according to the appended claims and equivalents.

What is claimed is:

1. A heat absorption method for an absorption chiller comprising:
   (a) providing a first absorption system circuit for operation within a first temperature range, said first circuit having generator means, condenser means, evaporator means, and absorber means operatively connected together;
   (b) providing a second absorption system circuit for operation within a second temperature range which has a lower maximum temperature than said first temperature range, said second circuit having generator means, condenser means, evaporator means, and absorber means operatively connected together;
   (c) heat exchanging refrigerant and absorber solution from said first circuit condenser and absorber with absorption solution from said generator of said second circuit; and
   (d) said evaporator of said first circuit and said evaporator of said second circuit both being disposed in thermal communication with an external heat load to withdraw heat from said heat load.

2. A heat absorption apparatus for use as an absorption chiller comprising:
   a first absorption system circuit for operation within a first temperature range;
   a second absorption system circuit for operation within a second temperature range which has a lower maximum temperature relative to said first temperature range;
   said first circuit having generator means, condenser means, evaporator means, and absorber means operatively connected together;
   said second circuit having generator means condenser means, evaporator means, and absorber means operative connected together;
   said first circuit condenser means and said first circuit absorber means being in heat exchange communication with said second circuit generator means; and
   said first circuit and second circuit evaporator means both being in heat exchange communication with an external heat load.

3. An absorption apparatus as claimed in claim 2, wherein said first absorption system circuit and said second absorption system circuit are fluidly sealed from each other.

4. An absorption apparatus as claimed in claim 3, wherein said second absorption system circuit includes lithium bromide and water as an absorption solution and water as a refrigerant.

5. An absorption apparatus as claimed in claim 4, wherein said second absorption system circuit is operated within a temperature range of from about 0° C. to about 130° C.

6. An absorption apparatus as claimed in claim 3, wherein said second absorption system circuit includes ammonia and water as an absorption solution and ammonia as a refrigerant.

7. An absorption apparatus as claimed in claim 3, wherein said first absorption system circuit includes lithium bromide and water with an anti-crystallization additive as an absorption solution, and water as a refrigerant.

8. An absorption apparatus as claimed in claim 7, wherein said first absorption system circuit is operated within a temperature range of from about 0° C. to about 280° C.

9. An absorption apparatus as claimed in claim 3, wherein said second absorption system circuit includes lithium bromide and water with an anti-crystallization additive as an absorption solution and water as a refrigerant.

10. An absorption apparatus as claimed in claim 3, wherein said first absorption system ciruuit includes ammonia and water as an absorption solution and ammonia as a refrigerant.

11. An absorption apparatus as claimed in claim 3, wherein said first absorption system circuit includes sodium hydroxide and water as an absorption solution and water as a refrigerant.

12. An absorption apparatus as claimed in claim 2, wherein each of said first circuit and second circuit evaporator means includes an evaporator coil for heat exchange between the refrigerant in the respective evaporator and a secondary fluid in said coil.

13. An absorption apparatus as claimed in claim 12, wherein said external heat load comprises an indoor environment, and wherein said second condenser means and absorber means are in heat exchange communication with an outdoor environment, said second consenser means and absorber means including a condenser coil and an absorber coil for heat exchange between refrigerant and an absorption solution and a secondary solution in said coils.

14. An absorption apparatus as claimed in claim 13, wherein said secondary fluid in said evaporator coils is in heat exchange communication with said indoor environment, said indoor environment being cooled thereby, and said secondary fluid in said condenser coil and absorber coil is in heat exchange communication with said outdoor environment.

* * * * *